United States Patent
Li et al.

(10) Patent No.: US 12,423,301 B2
(45) Date of Patent: Sep. 23, 2025

(54) DISKLESS ACTIVE DATA GUARD AS CACHE

(71) Applicant: Oracle International Corporation, Redwood Shores, CA (US)

(72) Inventors: Yunrui Li, Los Altos, CA (US); Wei-Ming Hu, Palo Alto, CA (US); Juan R. Loaiza, Woodside, CA (US); J. William Lee, Saratoga, CA (US); Adam Y. Lee, Palo Alto, CA (US); Carlos Ruiz, Madrid (ES); Amrish Srivastava, San Ramon, CA (US); Garret F. Swart, Palo Alto, CA (US); Mahesh Baburao Girkar, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/728,647

(22) Filed: Apr. 25, 2022

(65) Prior Publication Data
US 2023/0342355 A1  Oct. 26, 2023

(51) Int. Cl.
*G06F 16/2453* (2019.01)
*G06F 13/16* (2006.01)
(Continued)

(52) U.S. Cl.
CPC .... *G06F 16/24539* (2019.01); *G06F 13/1673* (2013.01); *G06F 16/24573* (2019.01); *G06F 16/248* (2019.01)

(58) Field of Classification Search
CPC ......... G06F 16/24539; G06F 16/24573; G06F 16/248; G06F 13/1673
See application file for complete search history.

(56) References Cited

U.S. PATENT DOCUMENTS 5,581,753 A  12/1996  Terry et al.
7,734,580 B2  6/2010  Lahiri et al.
(Continued)

OTHER PUBLICATIONS

Oracle.com, "Introduction to Oracle Data Guard", Oracle Database Online Documentation 10g Release 2 (10.2), https://docs.oracle.com/cd/B19306_01/index.htm, retrieved Mar. 2022, 11 pages.
(Continued)

*Primary Examiner* — Amy Ng
*Assistant Examiner* — William P Bartlett
(74) *Attorney, Agent, or Firm* — Hickman Becker Bingham Ledesma LLP

(57) ABSTRACT

Techniques are described herein for an integrated in-front database cache ("IIDC") providing an in-memory, consistent, and automatically managed cache for primary database data. An IIDC comprises a database server instance that (a) caches data blocks from a source database managed by a second database server instance, and (b) performs recovery on the cached data using redo records for the database data. The IIDC instance implements relational algebra and is configured to run any complexity of query over the cached database data. Any cache miss results in the IIDC instance fetching the needed block(s) from a second database server instance managing the source database that provides the IIDC instance with the latest version of the requested data block(s) that is available to the second instance. Because redo records are used to continuously update the data blocks in an IIDC cache, the IIDC guarantees consistency of query results.

26 Claims, 8 Drawing Sheets

(51) Int. Cl.
*G06F 16/2457* (2019.01)
*G06F 16/248* (2019.01)

(56) References Cited

U.S. PATENT DOCUMENTS

| | | | |
|---|---|---|---|
| 8,468,320 | B1 | 6/2013 | Stringham |
| 8,868,492 | B2 | 10/2014 | Garin et al. |
| 9,146,934 | B2 | 9/2015 | Hu |
| 2006/0004691 | A1 | 1/2006 | Sifry |
| 2006/0212481 | A1 | 9/2006 | Stacey et al. |
| 2007/0083505 | A1 | 4/2007 | Ferrari et al. |
| 2008/0228835 | A1 | 9/2008 | Lashley et al. |
| 2008/0256143 | A1 | 10/2008 | Reddy et al. |
| 2009/0268903 | A1 | 10/2009 | Bojinov et al. |
| 2010/0145909 | A1 | 6/2010 | Ngo |
| 2011/0145207 | A1 | 6/2011 | Agrawal et al. |
| 2011/0231362 | A1 | 9/2011 | Attarde et al. |
| 2012/0005452 | A1* | 1/2012 | Aral ............... G06F 12/0866 711/E12.078 |
| 2013/0060810 | A1* | 3/2013 | Maman ............ G06F 16/24552 707/769 |
| 2014/0059020 | A1 | 2/2014 | Hu et al. |
| 2014/0279849 | A1* | 9/2014 | Zhang ............... G06F 16/2282 707/609 |
| 2015/0120659 | A1* | 4/2015 | Srivastava ............ G06F 16/27 707/625 |
| 2016/0266842 | A1* | 9/2016 | Drzewiecki ......... G06F 12/0802 |
| 2017/0083411 | A1* | 3/2017 | Berinde ............. G06F 11/1402 |
| 2018/0267991 | A1* | 9/2018 | Desai ................. G06F 16/11 |
| 2019/0102113 | A1* | 4/2019 | Choudhury .......... G06F 3/067 |
| 2021/0081372 | A1* | 3/2021 | Lee .................... G06F 16/23 |

OTHER PUBLICATIONS

Oracle.com, "Introduction to Data Blocks, Extents, and Segments", Oracle Database Online Documentation 10g Release 2 (10.2), https://docs.oracle.com/cd/B19306_01/index.htm, retrieved Mar. 2022, 18 pages.

Memcached.org, "Memcached—A Distributed Memory Object Caching System", https://memcached.org/about, retrieved Mar. 2022, 4 pages.

Konduru, Nagesh, "Oracle Active Data Guard Best Practices", Oracle 11g, https://www.oracle.com/splash/www/index.html?o=oerror_d2NjLWV4dC53d3cub3JhY2xILmNvbS5ha2FkbnMubmV0, retrieved Mar. 2022, 7 pages.

Keycdn.com, "What Is Memcached?", https://www.keycdn.com/support/what-is-memcached, retrieved Mar. 2022, 3 pages.

Bauer et al., "Oracle9i Real Application Clusters Concepts", Release 2 (9.2), https://docs.oracle.com/cd/A97630_01/rac.920/a96597.pdf, dated Mar. 2002, 156 pages.

AWS.Amazon.com, "Redis: In-Memory Data Store. How it Works and Why You Should Use it", https://aws.amazon.com/redis/, retrieved Mar. 2022, 10 pages.

U.S. Appl. No. 12/871,795, filed Aug. 30, 2010, Notice of Allowance mailed Jul. 18, 2013.

U.S. Appl. No. 14/072,739, filed Nov. 5, 2013, Office Action, Apr. 9, 2014.

Final Office Action, U.S. Appl. No. 12/871,795, filed Aug. 30, 2010, Feb. 25, 2013.

Verbitski, Alexandre, et al., "Amazon Aurora: Design Considerations for High Throughput Cloud-Native Relational-Database", 12th Intl Conf of E-Business, Mgmt and Econs, ACMPUB27, pp. 1041-1052, doi: 10.1145/3035918.3056101, May 9, 2017, 12pgs.

Pendse, Sukhada, et al., "Oracle Database In-Memory on Active Data Guard: Real-time Analytics on a Standby Database", 2020 IEEE (ICDE), doi: 10.1109/ICDE48307.2020.00139, Apr. 20, 2020, pp. 1570-1578, 9pgs.

Current Claims, in International Application No. PCT/US2023/014033, dated Feb. 28, 2023, 3 pages.

Anonymous, "Database Buffer—javatpoint", Jan. 21, 2022, pp. 1-5, XP093165292, availabe: https://web.archive.org/web/20220121170833/https://www.javatpoint.com/database-buffer.

\* cited by examiner

202 A DATABASE SERVER INSTANCE RECEIVING A PLURALITY OF REDO RECORDS FOR CHANGES MADE TO A PRIMARY DATABASE

204 THE DATABASE SERVER INSTANCE AUTOMATICALLY APPLYING THE PLURALITY OF REDO RECORDS TO MAKE THE CHANGES IN AT LEAST A PORTION OF PRIMARY DATABASE DATA STORED IN A BUFFER CACHE TO PRODUCE FIRST UPDATED DATABASE DATA IN THE BUFFER CACHE

206 DETECT THAT THE BUFFER CACHE DOES NOT STORE ONE OR MORE DATA BLOCKS OF THE PRIMARY DATABASE REQUIRED BY THE QUERY

208 RESPONSIVE TO DETECTING THAT THE BUFFER CACHE DOES NOT STORE THE ONE OR MORE DATA BLOCKS REQUIRED BY THE QUERY, FETCH, INTO THE BUFFER CACHE, THE ONE OR MORE DATA BLOCKS FROM A SECOND DATABASE SERVER INSTANCE TO PRODUCE SECOND UPDATED DATABASE DATA IN THE BUFFER CACHE

210 GENERATE RESULTS FOR THE QUERY USING THE SECOND UPDATED DATABASE DATA STORED IN THE BUFFER CACHE

DISKLESS ACTIVE DATA GUARD AS CACHE

CROSS-REFERENCE TO RELATED APPLICATIONS

This application is related to the following, the entire contents of each of which is hereby incorporated by reference as if fully set forth herein:
   U.S. application Ser. No. 14/072,739, filed Nov. 5, 2013, now U.S. Pat. No. 9,146,934, issued Sep. 29, 2015, titled "Reduced Disk Space Standby"; and
   U.S. application Ser. No. 11/818,975, filed Jan. 29, 2007, now U.S. Pat. No. 7,734,580, issued Jun. 8, 2010, titled "Readable Physical Storage Replica And Standby Database System".

FIELD OF THE INVENTION

The present invention relates to improving database scalability, and more particularly, to providing an automatically-managed cache in front of a primary database.

BACKGROUND

Modern web applications often require massive database scalability. To provide lower access latency, many applications place a cache in front of a primary database. Such caches are generally implemented on the client side, and as such, are not maintained by the database management system that manages the primary database. Current popular products such as Redis and Memcached allow an application to query the primary database and stash the query results, with an expire time, in a client-side in-memory key-value store. Subsequent queries can be satisfied based on the contents of the client-side key-value store, which will return cached data as long as the data has not expired.

Generally, database applications are required to implement relational algebra for queries over the data in a client-side cache, which is generally not implemented by client-side cache systems. Database applications are also generally required to manage the data residing in the client-side cache, e.g., via the expire time associated with the cached data. However, utilization of an expire time does not guarantee that the cached data has not been changed in the primary database after the cached data was fetched from the primary database. Thus, the client-side cache management results in instances of stale data being included in the cache, and used by database applications. In other words, client-side cache systems do not guarantee query result consistency. For example, a database application performs a join over two tables that are stored in a client-side cache. If the two tables were not brought into the client-side cache at exactly the same moment, then the join result cannot be guaranteed to be internally consistent. Furthermore, it is possible for a query over a client-side cache system to retrieve data that is older than data retrieved by a previous query over the client-side cache system. For example, a first table is stored in a client-side cache at a first time and a second table is stored in the client-side cache at a later time. Before updating either of the tables, a database application queries the second table and then queries the first table, in which case it is possible for the second (more recent) query to return data that is older than the data returned by the first query.

Some stale data may be acceptable for database application functions. For example, when a user is simply browsing a flight reservation system, the system is able to show flight data that is stale, e.g., one second old. However, when a user requests to reserve a flight, which will modify database data, the reservation function requires the most current data since modifying stale data could result in violation of the ACID property of consistency and corrupted data.

Another approach to improve the scalability of a primary database is to create one or more physical or logical replicas of the primary database. Each replica of the primary database stores, in persistent storage, at least a portion of the primary database data, which is maintained consistent by applying redo information from the primary database. Database replicas implement relational algebra and are able to process any complexity of query over the replicated portion of the database data. However, a database replica requires significant resources that are not required for client-side cache systems, such as persistent storage space for the replicated data and processing power to apply the redo information to the stored data.

Yet another approach to improve the scalability of a primary database is described in the "Reduced Disk Space Standby" patent incorporated by reference above. Specifically, a diskless database server instance is configured to pull information directly from a persistently-stored replica of primary database data without involving the database server instance that maintains the replicated data (the "standby" instance). Because the diskless instance directly accesses the replicated data stored in persistent storage, the diskless instance does not have access to the most recent versions of the data blocks, which reside within the buffer cache of the standby instance. The standby instance may be configured to notify the diskless instance regarding which data blocks have changed in the replicated database data since a given timestamp. The diskless instance generally responds to these messages by invalidating any data blocks in its cache corresponding to the data blocks that were updated. Thus, after the diskless instance receives information that a data block has been updated in the replicated database data, any cached version of the block must be refetched from the replicated database data to satisfy any queries using the data block, which is a slow and expensive process that increases the cost of running queries by the diskless instance.

Techniques described herein are configured to address the issues with database scalability identified above.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:
FIG. 2 depicts an example flowchart for applying redo records to cached data blocks, and fetching data blocks into cache to satisfy a query.

DETAILED DESCRIPTION

In the following description, for the purposes of explanation, numerous specific details are set forth in order to provide a thorough understanding of the techniques described herein. It will be apparent, however, that the techniques described herein may be practiced without these specific details. In other instances, well-known structures and devices are shown in block diagram form in order to avoid unnecessarily obscuring the techniques described herein.

1. General Overview

Techniques are described herein for an integrated in-front database cache ("IIDC") providing an in-memory, consistent, and automatically managed cache for primary database data. An IIDC comprises a database server instance that (a) caches data blocks from a source database managed by a second database server instance, and (b) performs recovery on the cached data using redo records for the database data. The IIDC instance implements relational algebra and is configured to run any complexity of query over the cached database data. Any cache miss results in the IIDC instance fetching the needed block(s) from a second database server instance managing the source database, which may be the primary database server instance or a standby database server instance managing a physical replica of a primary database. This second database server instance provides the IIDC instance with the latest version of the requested data block(s) that is available to the second instance.

The IIDC instance receives and applies, to cached database data in the IIDC buffer cache, redo records indicating changes made to the primary database data. Thus, cached blocks retain their value over time and do not need to be refetched to obtain the latest versions of the blocks, which increases the value of the cached database data and reduces the resources required to maintain the cached data. Because redo records are used to continuously update the data blocks in an IIDC cache, the IIDC guarantees consistency of query results without intervention of any client-side logic. Specifically, a query executed by the IIDC always returns consistent data, without respect to the complexity of the query, because the IIDC is managed by a database server instance. Furthermore, because the IIDC maintains a query logical timestamp that indicates the logical timestamp up to which redo has been fully applied in the IIDC buffer cache, a later-executed query will never return data that is older than results returned for an earlier-executed query. The later-executed query is guaranteed to return query results that are current as of the time that the later query was executed.

Furthermore, because IIDC does not maintain a copy of source database data, an IIDC may be established without requiring persistent storage resources sufficient to store database data, as would be required for a physical or logical replica of the source database.

2. Integrated In-Front Database Cache

Figure 1:
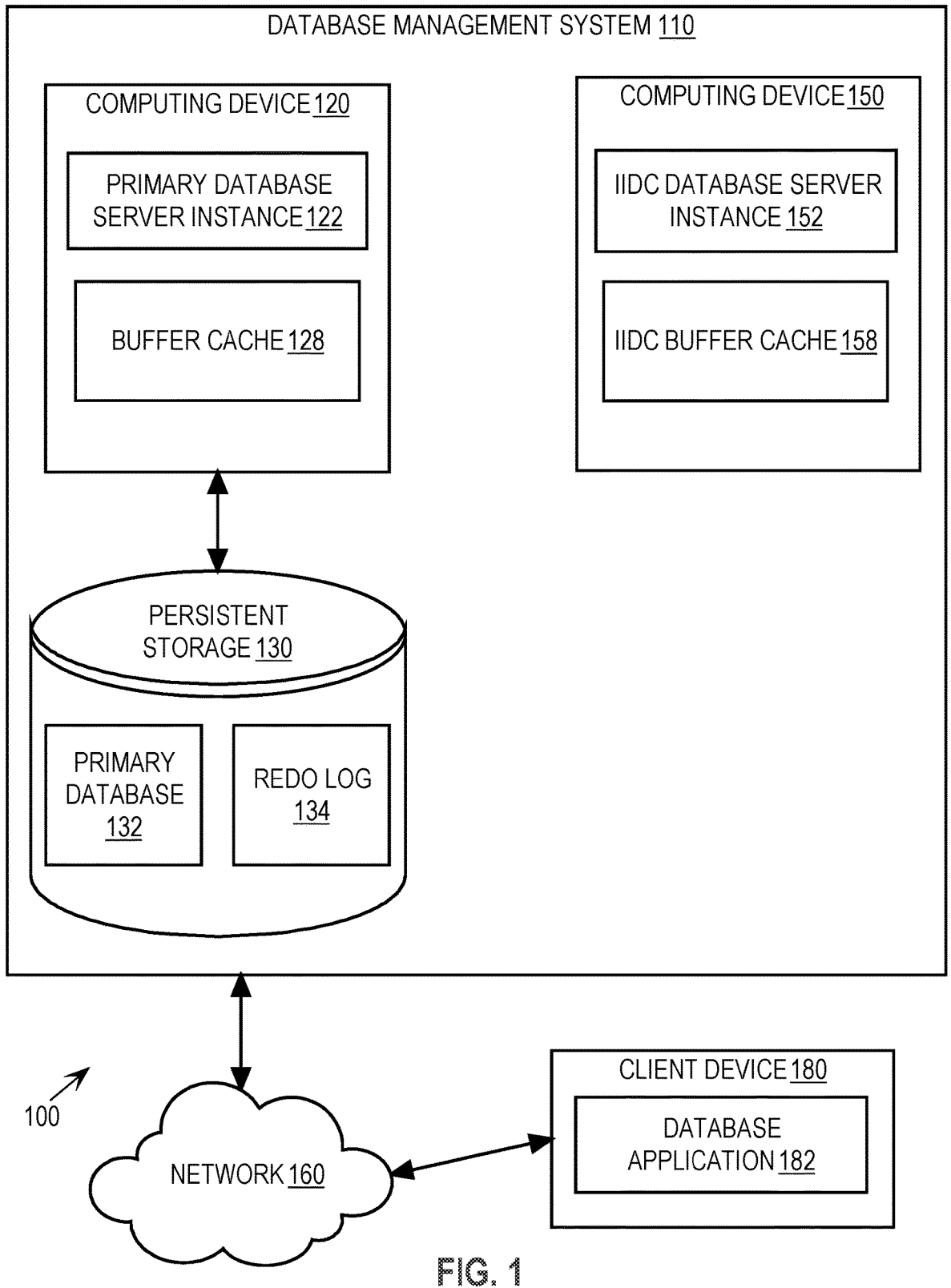
FIG. 1 depicts an example network configuration that includes a database management system.

FIG. 1 depicts an example network configuration 100 that includes a database management system (DBMS) 110 communicatively connected to a client device 180 via a network 160. Network 160 may be implemented in any way to facilitate communication between the entities.

DBMS 110 comprises a primary database server instance ("primary instance") 122 running on a computing device 120. Primary instance 122 is a collection of memory and processes that interact with and manage primary database 132 within persistent storage 130 and a buffer cache 128, which is at least partly implemented in byte-addressable memory of computing device 120 (such as DRAM or PMEM). DBMS 110 further comprises an IIDC database server instance ("IIDC instance") 152 running on a computing device 150. IIDC instance 152 is a collection of memory and processes that maintains cached database data within IIDC buffer cache 158, which is at least partly implemented in byte-addressable memory of computing device 150. IIDC instance 152 uses the cached data to satisfy queries over the database data, as described in further detail below. Computing device 120 and computing device 150 may be in the same physical location or may be in distinct physical locations. Example network configuration 100 is used herein to demonstrate the described techniques, but IIDC techniques described herein are not limited to being implemented on a database system configured according to FIG. 1. For example, primary database 132 of DBMS 110 may be maintained using multiple database server instances, such as with Oracle Real Application Clusters (RAC). In this case, primary database server instance 122 would be one of multiple primary database server instances in a primary database cluster.

Unlike an instance that maintains a logical or physical replica, IIDC instance 152 does not maintain any portion of the source database data (e.g., from primary database 132) in persistent storage. However, IIDC instance 152 can extend the cache information from byte-addressable memory of IIDC buffer cache 158 into a flash cache portion of IIDC buffer cache 158 implemented in persistent memory of computing device 150 (not depicted in FIG. 1). Further, IIDC instance 152 may store certain files (such as temporary files for sorts, configuration files, trace files, etc.) in persistent storage of computing device 150.

IIDC instance 152 satisfies queries using solely the data in IIDC buffer cache 158. If a required database block is not in IIDC buffer cache 158, IIDC instance 152 fetches the block from the database server instance managing the source database. Once a block is in IIDC buffer cache 158, the block is automatically updated using any applicable redo information from the source database.

FIG. 2 depicts an example flowchart 200 for applying redo records to cached data blocks, and fetching data blocks into cache to satisfy a query. Specifically, at step 202, a database server instance receives a plurality of redo records for changes made to a primary database. At step 204, the database server instance automatically applies the plurality of redo records to make the changes in at least a portion of the primary database data stored in a buffer cache to produce first updated database data in the buffer cache. The database server instance executes a query over the first updated database data comprising steps 206-210. Specifically, at step 206, it is detected that the buffer cache does not store one or more data blocks of the primary database required by the query. At step 208, responsive to detecting that the buffer cache does not store the one or more data blocks required by the query, the one or more data blocks are fetched, into the buffer cache, from a second database server instance to produce second updated database data in the buffer cache. Also, at step 210, results are generated for the query using the second updated database data stored in the buffer cache. The techniques depicted in flowchart 200 are described in further detail below.

The ability of IIDC instance 152 to reliably satisfy queries is based on the IIDC instance's access to source database data. For example, in the case where the source database of IIDC instance 152 is primary database 132, if network 160 is severed or if primary database instance 122 goes down, queries issued to IIDC instance 152 will get an error if the needed blocks are not entirely in IIDC buffer cache 158. Nevertheless, IIDC instance 152 itself will stay up through network or source database outages. When primary database instance 122 recovers, IIDC instance 152 is configured to re-establish its state and continue to serve queries using data from primary database 132.

2.1. IIDC Satisfying Queries

Database application 182 running on client device 180 may issue a query over primary database 132 that is satisfied by IIDC instance 152. For example, database application 182 establishes a database session with DBMS 110 to execute database commands from application 182. A database session comprises a particular connection through which the client may issue database requests. Connection configurations are described in further detail below. A connection used by database application 182 may be established directly with the target database server instance, or may be established based on the database server instance being part of a target cluster of instances (such as a primary database cluster maintaining primary database 132). Database application 182 may indicate that IIDC instance 152 may execute a given query by including a query hint, such as "cache_ok", or by issuing the query via a connection with an attribute that indicates that IIDC instance 152 may execute queries, such as a "read_only" attribute that indicates that all queries issued via the connection are read-only queries.

Figure 3A:
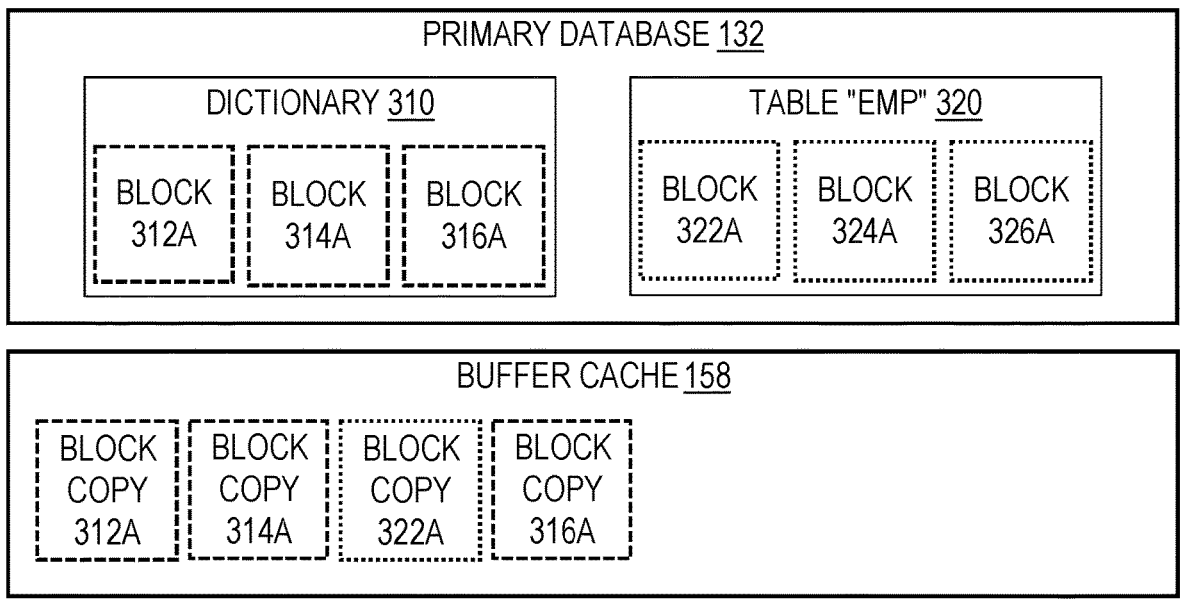
FIGS. 3A-3C depict data managed by a database management system, including primary database data and data cached by an integrated in-front database cache system.

For example, application 182 issues, via a connection with IIDC instance 152 that indicates that the queries may be executed by IIDC, the following Query 1:
Query 1
    SELECT Name
    FROM EMP
    WHERE Salary >100,000
IIDC instance 152 satisfies queries using data in IIDC buffer cache 158. To illustrate, FIG. 3A depicts a state 300 of data in DBMS 110, where primary database 132 includes a dictionary 310 stored in data blocks 312A, 314A, and 316A, and also includes a table "EMP" 320 stored in data blocks 322A, 324A, and 326A. A data block is a unit of space allocation within persistent storage or byte-addressable memory. Data blocks may be of any size, such as 2 kilobytes (KB), and may be organized into higher-level units of space allocation, such as extents (e.g., groups of data blocks) and segments (e.g., groups of extents). According to various embodiments, a segment is used to store a table, or a table partition, by DBMS 110. (For additional information on space allocation, see "Data Blocks, Extents, and Segments" in Oracle Database Online Documentation, 10g Release 2 (10.2), the entire contents of which are hereby incorporated by reference as if fully set forth herein.)

Continuing with the example of FIG. 3A, EMP 320 is stored within persistent storage 130 on a segment that includes data blocks 322A, 324A, and 326A, and dictionary 310 is stored within persistent storage 130 on a different segment that includes data blocks 312A, 314A, and 316A. IIDC instance 152 receives example Query 1 above, and resolves the reference to "EMP" using dictionary data block copies 312A, 314A, and/or 316A in IIDC buffer cache 158 to identify the blocks (e.g., block 322A) required to satisfy Query 1. In example data state 300, IIDC buffer cache 158 includes block copy 322A, and IIDC instance 152 uses cached block copy 322A to satisfy Query 1.

Queries to IIDC instance 152 return committed data, in a state as recent as the redo apply lag. Because it is implemented by a database server instance, IIDC instance 152 supports any query that is supported by DBMS 110. In general, queries to IIDC instance 152 always succeed as long as (1) the IIDC instance has not crashed, and (2) the IIDC redo apply lag is within a max apply threshold, e.g., if the user has set a max threshold.

2.2. Cache Misses

Upon a "cache miss" where a query being satisfied by IIDC instance 152 requires a data block that is not in IIDC buffer cache 158, IIDC instance 152 fetches the required data block from a source database, such as from primary instance 122 managing primary database 132. According to various embodiments, the source database for IIDC instance 152 is instead a physical of primary database 132 and IIDC instance 152 fetches a needed data block from a database server instance managing the database replica.

Figure 3B:
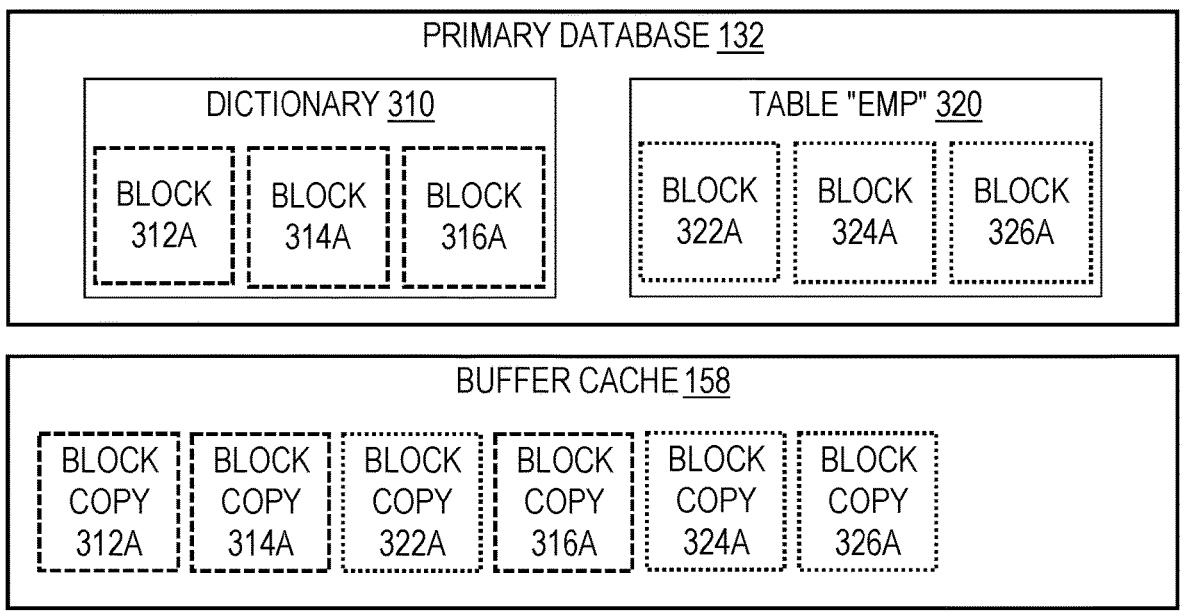

For example, application 182 issues the following Query 2 via the example connection described above:
Query 2
    SELECT *
    FROM EMP
IIDC instance 152 receives example Query 2, and resolves the reference to "EMP" using dictionary data block copies 312A, 314A, and/or 316A in IIDC buffer cache 158 to identify the blocks (e.g., data blocks 322A, 324A, and 326A) required to satisfy Query 2. In example data state 300, IIDC buffer cache 158 includes only block copy 322A for the table "EMP". Accordingly, in response to detecting this cache miss, IIDC instance 152 requests data blocks 324A and 326A from primary instance 122. Primary instance 122 responds to the request by sending the latest versions of data blocks 324A and 326A to IIDC instance 152 via network 160. Primary instance 122 sends the latest version of the data blocks, either residing in buffer cache 128 or in persistent storage 130. FIG. 3B depicts an updated data state 350 in which IIDC buffer cache 158 stores received data block copies 324A and 326A. Once the required data blocks are in IIDC buffer cache 158, IIDC instance 152 uses cached block copies 322A, 324A, and 326A to satisfy Query 2.

According to various embodiments, IIDC instance 152 authenticates to primary instance 122 and requests the required data blocks from the primary instance. Therefore, according to various embodiments, IIDC instance 152 utilizes block transfer protocol with proxy task processes which maintain sustaining connections between IIDC instance 152 and primary instance 122. Furthermore, if the source database is a physical replica of primary database 132, then IIDC instance 152 authenticates with the standby database instance managing the replica and requests the required blocks from the standby database instance. The standby database instance responds to the request with the latest version of the requested data block, whether the latest version is from the buffer cache of the standby database instance or from persistent storage storing the physical copy of primary database 132.

Many times, database applications repeatedly utilize the same data blocks, which results in relatively infrequent cache misses when the IIDC is in a steady state. The frequency of cache misses may be further reduced using appropriate replacement policies for IIDC buffer cache 158.

2.2.1. Cache Misses for a Cluster of Primary Database Server Instances

According to various embodiments, when primary database 132 is maintained using a cluster of primary database server instances, IIDC instance 152 can opt to retrieve a data block from a particular primary database server instance of the cluster, e.g., for efficiency reasons. For example, when a particular primary database server instance of the cluster is affined to a particular database object, any blocks belonging to the particular database object that are cached by the primary database cluster are in the particular instance's buffer cache. Database affinities may be on any of a number of levels, including by file, by object, by pluggable database, etc. Herein, references to data blocks being affined to a particular database server instance refers to any level of database affinity involving the data blocks.

According to an embodiment, IIDC instance 152 tracks affinity mapping information for the instances of the primary database cluster and uses the affinity mapping information to determine from which primary server instance to fetch data blocks. Choosing the database server instance from which to retrieve data blocks using affinity mapping information allows retrieval of the requested data block from the instance's buffer cache (when possible), which is much faster than retrieval of data blocks from persistent storage or from the buffer cache of another database server instance of the primary cluster.

According to various embodiments, IIDC instance 152 maintains affinity mapping information as a best-effort. For example, in the absence of affinity mapping information for a particular database object, IIDC instance 152 attempts to fetch the required data blocks from any database server instance of the primary database cluster. In response, the database server instance returns affinity information for the target database object, either with or without the requested data block. If the affinity information is returned without the requested data block, IIDC instance 152 then requests the required block from the database server instance indicated in the received affinity information. IIDC instance 152 also updates the affinity mapping information to include the received affinity mapping.

According to various embodiments, IIDC instance 152 includes, in buffer cache 158, data blocks storing affinity mapping information maintained within primary database 132. When any affinity mapping is changed by DBMS 110, one or more redo records are generated to reflect the change, and IIDC instance 152 applies these one or more redo records to the cached data thereby maintaining the affinity information.

2.3. Applying Redo Records

Once a block is cached in IIDC buffer cache 158, IIDC instance 152 automatically updates the block by applying redo records recording changes made to the block in primary database 132. Thus, the cached data remains up-to-date without requiring IIDC instance 152 to regularly fetch updated data blocks from the source database, and each query to IIDC instance 152 always returns transactionally consistent data. Furthermore, a redo stream can include other information, such as special redo markers, that is not specific to a particular database block, and that IIDC instance 152 applies to data in IIDC buffer cache 158. For example, there are redo markers that teach a standby database system how to invalidate certain metadata cache entries (e.g., library cache entries). According to various embodiments, IIDC instance 152 is configured to apply redo information that is not data block-specific in a similar manner to other kinds of database server instances.

For example, one or more redo records that describe changes performed within primary database 132 are generated and stored in redo log 134 in persistent storage 130. These redo records are sent to IIDC instance 152 by one of: primary instance 122, a listener service that scrapes redo log 134, or another database server instance that has access to the redo records from primary database 132 (such as an instance maintaining a physical replica of primary database 132). When IIDC instance 152 receives any redo records applicable to data blocks that are not in IIDC buffer cache 158, IIDC instance 152 discards the redo records. When a data block ages out or is being replaced according to any kind of replacement policy, no data is stored for the block in persistent storage. IIDC instance 152 is able to process queries that reflect a consistent state of primary database 132 that is no later than a latest-readable query time, which is calculated by the IIDC instance 152 based on the redo records that have been applied to cached data blocks.

Figure 3C:
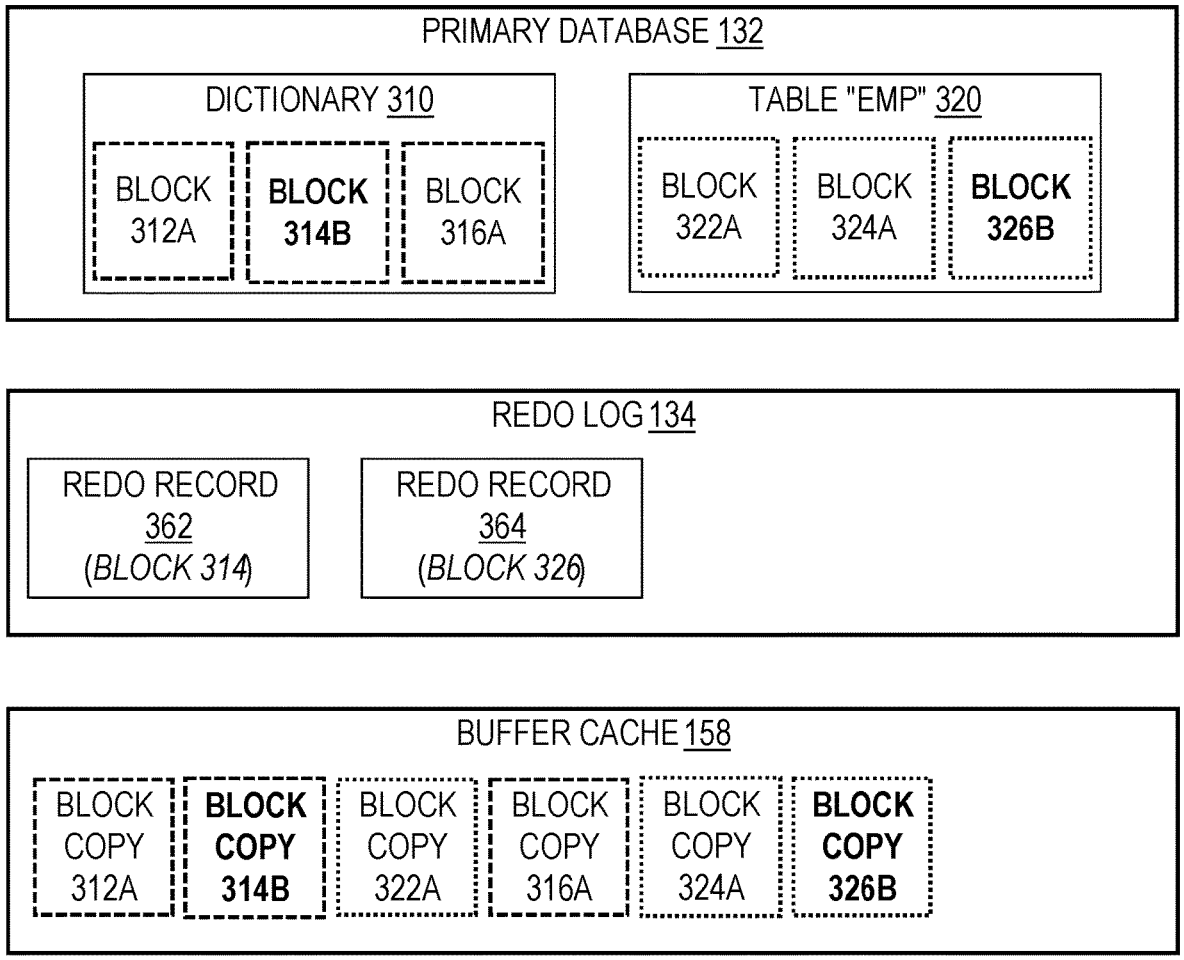

To illustrate, FIG. 3C depicts an updated data state 360 in which data blocks 314 and 326 have been updated from version A to version B (i.e., as shown by the updated labels "314B" and "326B"). Redo log 134 includes a redo record 362 that records the change made to block 314 and a redo record 364 that records the change made to block 326. According to an embodiment, primary instance 122 sends redo records 362 and 364 to IIDC instance 152, which applies the changes recorded in these redo records to the copies of blocks 314 and 326 in IIDC buffer cache 158 (as depicted by block copies 314B and 326B in IIDC buffer cache 158). Furthermore, it is possible for IIDC instance 152 to fetch an updated version of a data block residing in the IIDC buffer cache 158 prior to receiving the redo records that indicate the one or more changes that were made to the previously-cached version of the block. Such a scenario does not affect the correctness of database query results returned by IIDC instance 152 given that IIDC instance 152 returns committed results as of the query logical timestamp maintained by the instance. If the actual block content contains changes beyond an applicable query logical timestamp (e.g., the delta of block 326B and bock 326A), necessary undo will be applied before returning the result for the database query.

2.4. Prewarming

For most workloads, when IIDC buffer cache 158 is in a steady state filled with data blocks, fetching blocks on an as-needed basis and using a least-recently used (LRU) buffer replacement policy results in efficient cache management. However, while IIDC buffer cache 158 is ramping up, especially right after startup or a restart after a crash event, reading blocks into the buffer cache one by one would take a long time to fill up the cache and result in many cache misses.

To reduce the number of cache misses when IIDC instance 152 first starts, the instance pre-fetches blocks to speed up cache warming. According to various embodiments, during startup shortly after IIDC buffer cache 158 opens, a prewarming mechanism is utilized to extend each single-read of data blocks (e.g., in connection with a cache miss) to fetch additional data blocks, such as retrieving 1 megabyte (MB) of data, or retrieving the data within an extent boundary of the fetched data block, etc. The prewarming mechanism particularly helps with kernel general library (KGL) object population during startup, and continues to populate IIDC buffer cache 158 for any workload until the buffer cache is full.

Furthermore, according to various embodiments, IIDC instance 152 periodically records identifying information (such as the data block addresses and OBJDs, described in further detail below) for the blocks in IIDC buffer cache 158, as a snapshot, into a metadata file on the local disk. At the next startup of IIDC instance 152, if IIDC instance 152 connects back to the same source database and/or is associated with the same service (also described in further detail below), IIDC instance 152 prewarms the buffer cache by fetching, from the source database server instance, the blocks identified in the stored metadata file.

3. Example Database System Configurations with Iidc

Application 182 can directly connect to IIDC instance 152 similar to how an application connects to standby database server instances. Application 182 can also directly connect to a service exported by all or a subset of IIDC instances within the DBMS. Multiple ways to configure a database system with IIDC are described in further detail below, including static configuration, uniform configuration, and partitioned configuration.

3.1. Static Configuration

According to a static configuration, application 182 maintains two direct connections, one to IIDC instance 152 and one to primary instance 122. Read-only queries that do not need to see the most current data are issued via the connection to the IIDC instance 152 and other queries are issued via the connection to primary instance 122. In such embodiments, it is the responsibility of application 182 to split the read and write traffic between the two physical connections.

3.2. Uniform Configuration

According to a uniform configuration, application 182 maintains a single logical connection with a DBMS, and a client driver internally maintains, for each logical connection with a DBMS, two physical connections: one to primary instance 122 and one to IIDC instance 152. Application 182 uses code markers (such as setReadOnly(true) calls and setReadOnly(false) calls) to mark some sections of code as "read only," or more precisely, as "read-only allowing lag". The client driver automatically sends SQL statements in "read-only" code blocks to the IIDC instance 152 via the physical connection to the IIDC instance.

In a uniform configuration, all IIDC instances in a DBMS support the same one or more IIDC services, where each service represents a schema that identifies a particular set of data in the source database. IIDC instances support services, which can be configured using standard methods such as DBMS SERVICE for database instances. Utilization of services by IIDC instances allows a client driver (such as a database connectivity driver of database application 182) to take advantage of IIDC without specifying the IIDC instances explicitly. Thus, database configuration may be adjusted without requiring adjustment of the database application clients. A remote listener connects client sessions to IIDC instances supporting the IIDC service either randomly or based on load.

According to various embodiments, the services supported by IIDC instances are different than the services supported by the primary database itself. This is because a query on IIDC does not see the most current data, but instead sees committed data with the redo apply lag. IIDC design recognizes this difference and configures IIDC instances to have their own service.

Figure 4A:
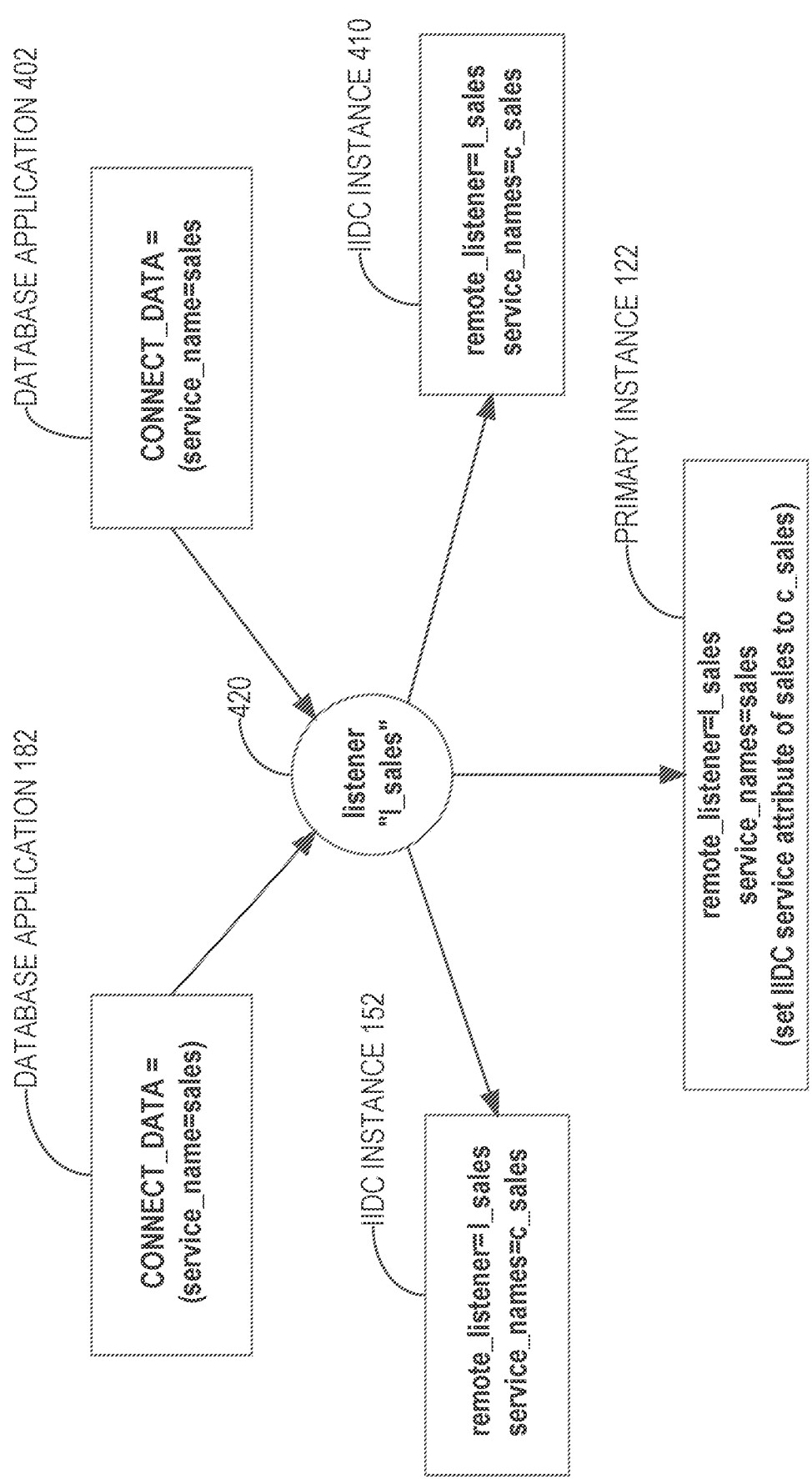
FIGS. 4A-4B depicts listener-based configurations for a database management system.

To illustrate uniform configuration, FIG. 4A depicts a network configuration 400 comprising database application 182 and a second database application 402 communicatively coupled to a listener service 420. Listener service 420, named "1 sales", is configured to route database commands from the client database applications to one of: IIDC instance 152, a second IIDC instance 410, or primary instance 122. Accordingly, each of IIDC instance 152, second IIDC instance 410, and primary instance 122 indicates that 1 sales is the remote listener for the instances.

As shown, both database applications 182 and 402 have established connections to DBMS 110 with the service_name attribute value "sales". Primary instance 122 is associated with a service named "sales", and both IIDC instances 152 and 410 are associated with the same service named "c_sales", according to a uniform configuration. Listener service 420 has access to information (e.g., maintained by primary instance 122) that indicates that the c_sales service is the IIDC counterpart to the sales service.

According to various embodiments, listener service 420 informs database connectivity drivers of client applications 182 and 402 associated with the sales service that c_sales is the IIDC counterpart to the sales service. For example, listener service 420 informs a JDBC (Java database connectivity) driver of database application 182 and a JDBC driver of database application 402 that c_sales is the IIDC counterpart to the sales service. Based on this information, each JDBC driver opens two connections, one connection to primary instance 122 for the sales service, and one connection to any IIDC instance that supports the c_sales service. To illustrate, the JDBC driver of database application 182 establishes a connection with primary instance 122 and a connection with IIDC instance 152. Any SQL statement within a "read-only" code block is sent to IIDC instance 152, and any other SQL statement is sent to primary instance 122 via the established connection.

According to various embodiments, in a uniform configuration, client sessions are evenly distributed among IIDC instances by the listener service. In this configuration, all IIDC instances will cache more or less the same set of data.

3.3. Partitioned Configuration

According to a partitioned configuration, as with the uniform configuration, application 182 maintains a single logical connection with a DBMS and uses code markers to mark some sections of code as "read only". Furthermore, in a partitioned configuration, service affiliation may be used to partition work among different IIDC instances caching data for the same source database. This can aid in the common circumstance where a primary database instance is implemented using powerful computing resources, while associated IIDC instances are implemented using less-powerful resources. It may be challenging for such IIDC instances to cache all of the data being utilized within the primary database.

When the primary database, with multiple associated IIDC instances, is associated with multiple services representing substantially different sets of database objects, then the different IIDC instances may be affiliated with different cache-type services that are related to the different services of the primary database to partition the caching needs among the IIDC instances. Thus, different workloads are directed to different IIDC instances using services such that different IIDC instances cache different sets of data. With partitioned configuration, the effective aggregate cache size of all IIDC instances can be much larger than a single IIDC instance. Accordingly, with multiple IIDC instances caching data for a single source database, a partitioned configuration can cache much more data in memory than a uniform configuration.

The sets of database objects identified by different services may be distinct or may have one or more database objects in common. Also, multiple database instances may be associated with one or more of the same services and database instances may be associated with multiple services.

Figure 4B:
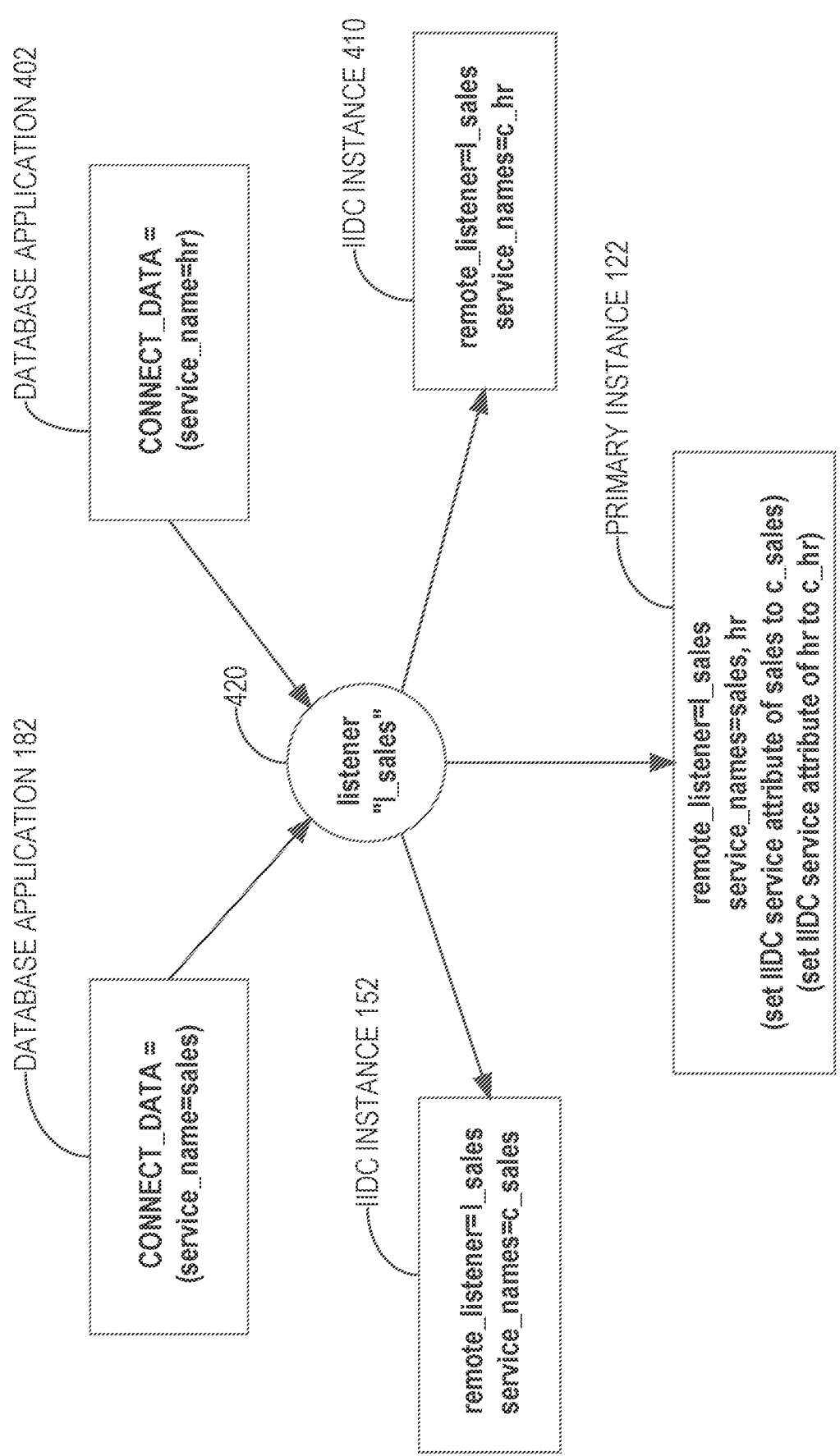

To illustrate partitioned configuration, FIG. 4B depicts a second network configuration 450 in which primary instance 122 is associated with the services hr and sales. The sales service identifies a first set of database objects within primary database 132, and an hr service identifies a second set of database objects with primary database 132. IIDC instance 152 is associated with the service c_sales and IIDC instance 410 is associated with the service c_hr, where c_hr is the IIDC counterpart to the hr service.

Database application 182 establishes a connection with the service_name attribute of "sales", indicating that the application requires information from the database objects identified by the sales service. Database application 402 establishes a connection with the service_name attribute of "hr", indicating that the application requires information from the database objects identified by the hr service. According to the process described above, database application 182 establishes a connection to primary instance 122 (associated with sales) and a connection to IIDC instance 152 (associated with c_sales). Database application 402 establishes a connection to primary instance 122 (associated with hr) and a connection to IIDC instance 410 (associated with c_hr). Thus, the resources of each of the various IIDC instances are focused on particular database objects within primary database 132, which reduces the potential for cache misses and increases the efficiency of the IIDC instance caching mechanisms.

4. Stale Dictionary Data in Iidc

IIDC instance 152 uses dictionary data cached in IIDC buffer cache 158 to resolve references to database objects in received SQL statements. When primary database 132 (the example target database of IIDC instance 152) is maintained using a cluster of database server instances and the cached dictionary data is stale, using the cached dictionary data can be problematic. For example, each database object in primary database 132 is associated with a data object number (OBJD), which is used to determine the lock identifier for the database object. The lock identifier may be required to look up the latest version of the block within primary database 132. Using a stale OBJD to look up a block in primary database 132 may result in identifying a stale version of the requested data block, such as when the entries corresponding to a particular object are affined with a particular instance of the primary database cluster maintaining primary database 132 (i.e., all buffers for that object are in a specific instance's cache, if cached anywhere at all).

According to various embodiments, to identify data blocks that may be stale because of stale dictionary data, when IIDC instance 152 fetches data blocks from the source database using the cached dictionary data, IIDC instance 152 marks the fetched data blocks as "potentially current" (as opposed to a "current" data block that is known to be the latest version of the data block as recent as the redo apply lag). For example, when IIDC instance 152 makes a block fetch request, primary instance 122 reads the block with the potentially stale OBJD sent from IIDC instance 152 to respond to the IIDC request. The fetched block is the most current block that was identified by the potentially stale OBJD, but may not be the most current version of the data block maintained by primary instance 122. Marking the block as "potentially current" facilitates further scrutiny by IIDC instance 152 to determine whether the block should be marked as "current" or should be dropped and refetched.

Whether or not the response to an IIDC request is a stale data block, the fetched "potentially current" data block is used to respond to the query that caused the cache miss. This is acceptable because the OBJD used to fetch the "potentially current" data block was identified for the target query, and as such is sufficient to satisfy the query. If a second SQL statement also refers to the fetched data block, the fetched data block may be used to satisfy the second SQL statement if the second SQL statement also includes the OBJD used to fetch the "potentially current" data block. If the second SQL statement includes a different OBJD for the data block, then the SQL statement was resolved using updated dictionary data stored in IIDC buffer cache 158. In this case, the "potentially current" data block is known to be stale and is dropped from IIDC buffer cache 158; IIDC instance 152 requests the newest version of the data block from primary instance 122 using the updated dictionary data in IIDC buffer cache 158.

In order to determine whether a "potentially stale" data block is "current" or stale, recovery using redo records will be attempted on the data block. Application of redo records requires the particular version of the data block that existed at the time of the recorded change (the "initial state" for a redo record). According to various embodiments, for "potentially current" cached data blocks, IIDC instance 152 performs a detailed comparison between the "potentially current" data block and the attributes of the initial state indicated in the redo record. If the cached block matches the initial state description in the redo record, the redo record is applied to the cached data block and the block is marked as "current" rather than "potentially current". Any future redo records that target the "current" data block may be applied without a detailed determination of whether the data block matches the initial state information stored by the redo record. However, if the "potentially current" data block does not match the initial state information in the redo record, or if it is unclear whether the "potentially current" data block matches the initial state information in the redo record, then the dictionary data is refreshed by application of redo records to the cached data blocks storing the dictionary data, or by re-fetching the cached data blocks storing the dictionary data from the primary database. The updated dictionary data is used to request the latest version of the data block to replace the "potentially current" data block in IIDC buffer cache 158.

5. Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command or query may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g., Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

As transactions are committed by a database system, the database system transitions from one transactional consistent state to another transactional consistent state. A transactional consistent state is one in which the database files managed by a database system is able to reflect all changes made by committed transactions and none of the changes made by the uncommitted transactions.

A logical time is associated with each consistent state. The logical time for a subsequent consistent state is later than the logical time for the previous consistent state. An example of a logical time is a system change number (SCN), sometimes referred to as a "System Commit Number." Each commit of a transaction is associated with a SCN. A counter for the SCN is incremented whenever a transaction is committed and/or the commit record for the transaction is generated. The transaction and its commit record are associated with the new counter value or SCN. Transactions recorded with redo records are associated with their corresponding SCNs therein.

Embodiments of the invention are further illustrated herein within the context of SCNs. However, the present invention is not limited to a logical time in the form of an SCN. In order to process a query that is consistent with the state of primary database 132 at a particular SCN, the redo records associated with all previous SCNs must have been applied by IIDC instance 152 to all data blocks stored in IIDC buffer cache 158. According to various embodiments, when IIDC instance 152 has determined that records for all SCNs prior to a particular SCN have been applied, it advances a latest-readable SCN (i.e., latest-readable query time also referred to herein as a "query logical timestamp") to that particular SCN.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected nodes that share access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal apply processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user defined execution context such as a user thread or fiber. Database processes may also include "database server system" processes which provide services and/or perform functions on behalf of entire database server. Such database server system processes include listeners, garbage collectors, log writers, and recovery processes.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return datatype and the datatypes of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e., java file) and the compiled version of the class (i.e., class file).

5.1. Query Optimization and Execution Plans

Query optimization generates one or more different candidate execution plans for a query, which are evaluated by the query optimizer to determine which execution plan should be used to compute the query.

Execution plans may be represented by a graph of interlinked nodes, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e., one for which a potentially more efficient and less costly execution plan can be generated. Examples of query transformation include view merging, subquery unnesting, predicate move-around and pushdown, common subexpression elimination, outer-to-inner join conversion, materialized view rewrite, and star transformation.

6. Hardware Overview

An application or instance, such as primary instance 122 or IIDC instance 152, runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

One or more of the functions attributed to any process described herein, may be performed any other logical entity that may or may not be depicted in FIG. 1, according to one or more embodiments. In some embodiments, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
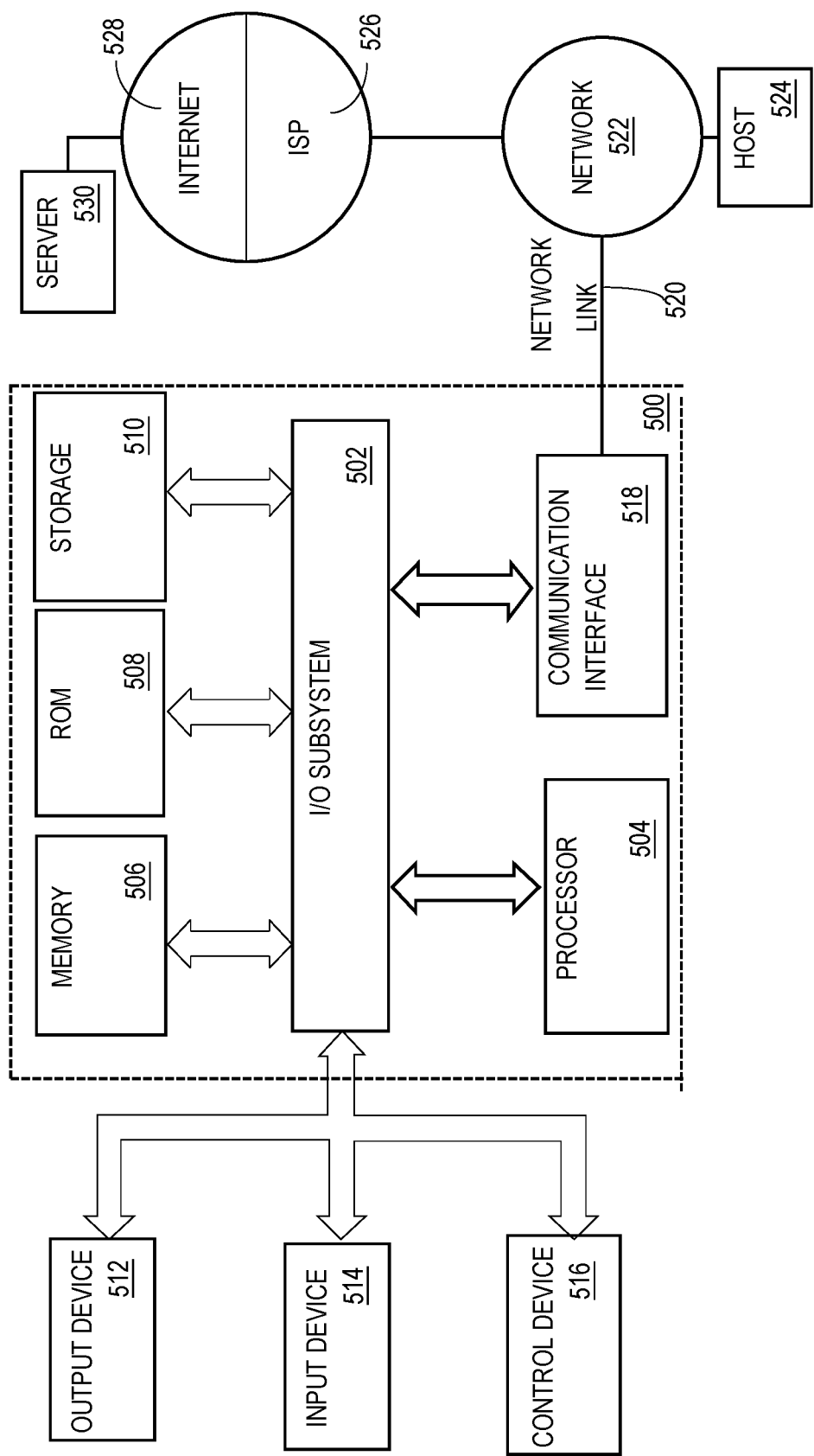
FIG. 5 is a block diagram that illustrates a computer system upon which various embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Software Overview

Figure 6:
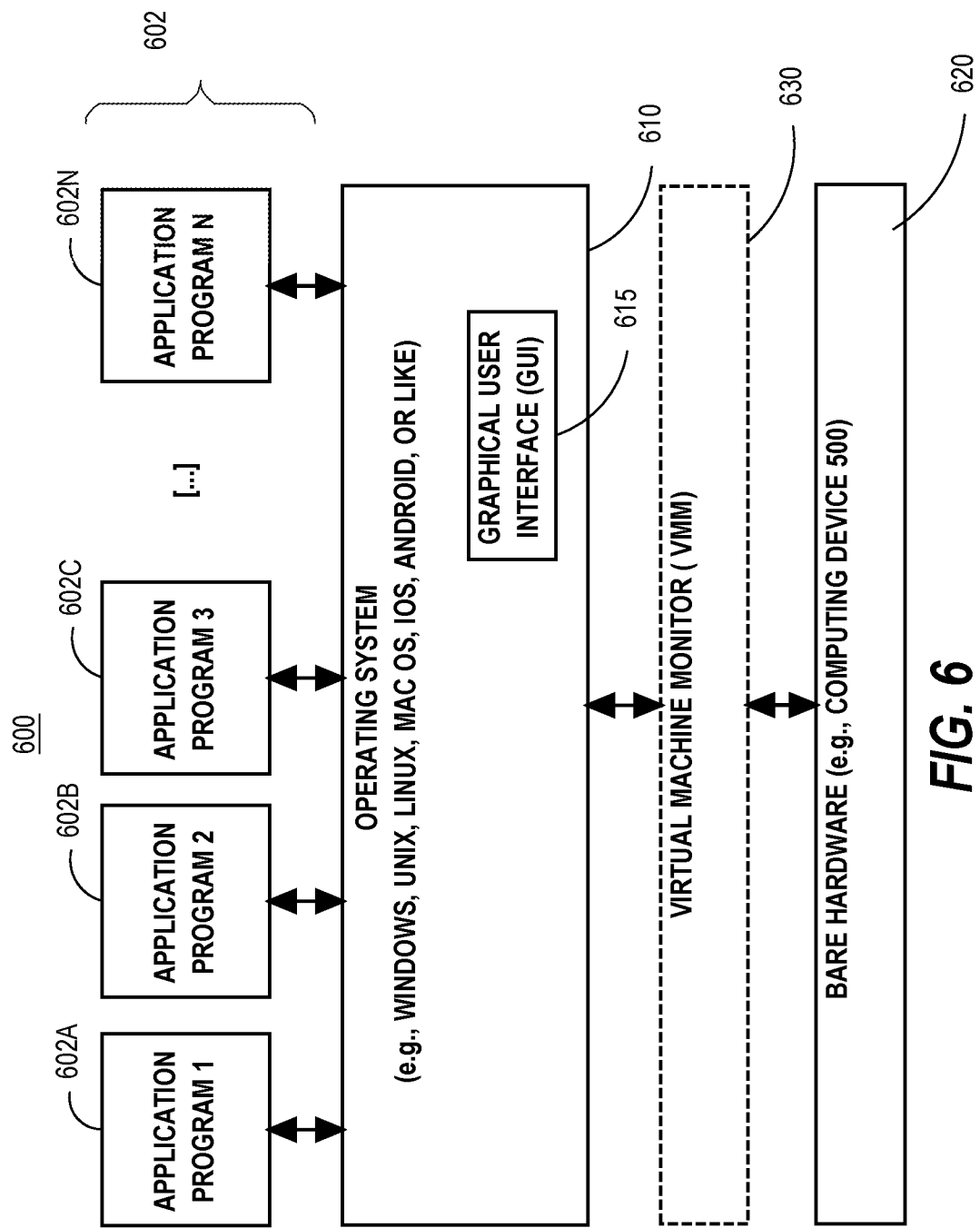
FIG. 6 is a block diagram of a basic software system that may be employed for controlling the operation of a computer system.

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

8. Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   an integrated in-front database cache (IIDC) database server instance receiving a plurality of redo records for changes made to a primary database, wherein the IIDC database server does not maintain a copy of said primary database;
   the IIDC database server instance automatically applying the plurality of redo records to make the changes in at least a portion of primary database data stored in a buffer cache to produce first updated database data in the buffer cache;
   the IIDC database server instance executing a first query over the first updated database data comprising:
     the IIDC database server instance detecting that the first updated database data in the buffer cache stores one or more first data blocks required by the first query, and
     the IIDC database server instance generating results for the first query using the first updated database data stored in the buffer cache;
   the IIDC database server instance executing a second query over the first updated database data comprising:
     detecting that the buffer cache does not store one or more second data blocks stored in the primary database required by the second query,
     responsive to detecting that the buffer cache does not store the one or more second data blocks required by the second query, fetching, into the buffer cache, the one or more second data blocks stored in the primary database from a primary database server instance that manages the primary database or from a standby server instance of the primary database to produce second updated database data in the buffer cache, and generating results for the second query using the second updated database data stored in the buffer cache;
   wherein the method is performed by one or more computing devices.

2. The computer-executed method of claim 1, wherein the fetched one or more second data blocks are most-recent versions of the one or more second data blocks in the primary database.

3. The computer-executed method of claim 1, wherein the primary database server instance retrieves the one or more second data blocks from one or more of: a second buffer cache maintained by the primary database server instance; or database data, stored on persistent storage, maintained by the primary database server instance.

4. The computer-executed method of claim 1, wherein:
   the primary database is managed by a plurality of database server instances that comprises the primary database server instance;
   the method further comprises:
     the IIDC database server instance maintaining affinity mapping data that maps data blocks to database server instances of the plurality of database server instances;
     determining, based on the affinity mapping data, that the one or more second data blocks are affined to the primary database server instance;
     wherein said fetching, into the buffer cache, the one or more second data blocks from the primary database server instance is performed responsive to the determining, based on the affinity mapping data, that the one or more second data blocks are affined to the primary database server instance.

5. The computer-executed method of claim 1, further comprising a standby database server instance manages a standby database that is a replica of the primary database.

6. The computer-executed method of claim 5, wherein the primary database server instance retrieves the one or more second data blocks from one or more of: a second buffer cache maintained by the primary database server instance; or database data, stored on persistent storage, maintained by the primary database server instance.

7. The computer-executed method of claim 1, wherein the plurality of redo records is received from a database server instance that manages the primary database.

8. The computer-executed method of claim 1, wherein the plurality of redo records is received from a service other than a database server instance that manages the primary database.

9. The computer-executed method of claim 1, wherein the buffer cache is implemented, at least in part, within byte-addressable memory.

10. The computer-executed method of claim 1, further comprising, after fetching, into the buffer cache, the one or more second data blocks from the primary database server instance:
    receiving one or more redo records for second changes made to a particular data block of the one or more second data blocks; and
    applying the one or more redo records to make the second changes to the particular data block stored in the buffer cache.

11. The computer-executed method of claim 1, further comprising:
    receiving one or more redo records for second changes made to a particular data block; and
    responsive to determining that the particular data block is not within the buffer cache, dropping the one or more redo records without making any changes reflected in the one or more redo records.

12. The computer-executed method of claim 1, further comprising:
    using cached dictionary data, in the buffer cache, to identify a particular data block, of the one or more second data blocks, for the second query;
    after fetching, into the buffer cache, the one or more second data blocks, marking the particular data block as potentially current;
    after marking the particular data block as potentially current, applying a first redo record to the particular data block based on a detailed comparison of initial state information in the first redo record and information for the particular data block;
    based on the applying the first redo record to the particular data block, marking the particular data block as current;

after marking the particular data block as current, applying a second redo record to the particular data block without performing the detailed comparison.

13. One or more non-transitory computer-readable media storing instructions that, when executed by one or more processors, cause:
an integrated in-front database cache (IIDC) database server instance receiving a plurality of redo records for changes made to a primary database, wherein the IIDC database server does not maintain a copy of said primary database;
the IIDC database server instance automatically applying the plurality of redo records to make the changes in at least a portion of primary database data stored in a buffer cache to produce first updated database data in the buffer cache;
the IIDC database server instance executing a first query over the first update database data comprising:
the IIDC database server instance detecting that the first updated database data in the buffer cache stores one or more first data blocks required by the first query, and
the IIDC database server instance generating results for the first query using the first updated database data stored in the buffer cache;
the IIDC database server instance executing a second query over the first updated database data comprising:
detecting that the buffer cache does not store one or more data second blocks stored in the primary database required by the second query,
responsive to detecting that the buffer cache does not store the one or more second data blocks required by the second query, fetching, into the buffer cache, the one or more second data blocks stored in the primary database from a primary database server instance that manages the primary database or from a standby server instance of the primary database to produce second updated database data in the buffer cache, and
generating results for the second query using the second updated database data stored in the buffer cache.

14. The computer-executed method of claim 1, wherein the second database server instance manages the primary database.

15. The one or more non-transitory computer-readable media of claim 13, wherein the primary database server instance manages the primary database.

16. The one or more non-transitory computer-readable media of claim 15, wherein the primary database server instance retrieves the one or more second data blocks from one or more of: a second buffer cache maintained by the primary database server instance; or database data, stored on persistent storage, maintained by the primary database server instance.

17. The one or more non-transitory computer-readable media of claim 13, wherein:
the primary database is managed by a plurality of database server instances that comprises the primary database server instance;
the instructions further comprise instructions that, when executed by one or more processors, cause:
the database server instance maintaining affinity mapping data that maps data blocks to database server instances of the plurality of database server instances;
determining, based on the affinity mapping data, that the one or more second data blocks are affined to the primary database server instance;
wherein said fetching, into the buffer cache, the one or more second data blocks from the primary database server instance is performed responsive to the determining, based on the affinity mapping data, that the one or more second data blocks are affined to the primary database server instance.

18. The one or more non-transitory computer-readable media of claim 13, further comprising a standby database server instance that manages a standby database that is a replica of the primary database.

19. The one or more non-transitory computer-readable media of claim 18, wherein the primary database server instance retrieves the one or more second data blocks from one or more of: a second buffer cache maintained by the primary database server instance; or database data, stored on persistent storage, maintained by the primary database server instance.

20. The one or more non-transitory computer-readable media of claim 13, wherein the plurality of redo records is received from a database server instance that manages the primary database.

21. The one or more non-transitory computer-readable media of claim 13, wherein the plurality of redo records is received from a service other than a database server instance that manages the primary database.

22. The one or more non-transitory computer-readable media of claim 13, wherein the buffer cache is implemented, at least in part, within byte-addressable memory.

23. The one or more non-transitory computer-readable media of claim 13, wherein the instructions further comprise instructions that, when executed by one or more processors, cause, after fetching, into the buffer cache, the one or more second data blocks from the primary database server instance:
receiving one or more redo records for second changes made to a particular data block of the one or more second data blocks; and
applying the one or more redo records to make the second changes to the particular data block stored in the buffer cache.

24. The one or more non-transitory computer-readable media of claim 13, wherein the instructions further comprise instructions that, when executed by one or more processors, cause:
receiving one or more redo records for second changes made to a particular data block; and
responsive to determining that the particular data block is not within the buffer cache, dropping the one or more redo records without making any changes reflected in the one or more redo records.

25. The one or more non-transitory computer-readable media of claim 13, wherein the instructions further comprise instructions that, when executed by one or more processors, cause:
using cached dictionary data, in the buffer cache, to identify a particular data block, of the one or more second data blocks, for the second query;
after fetching, into the buffer cache, the one or more second data blocks, marking the particular data block as potentially current;
after marking the particular data block as potentially current, applying a first redo record to the particular data block based on a detailed comparison of initial state information in the first redo record and information for the particular data block;
based on the applying the first redo record to the particular data block, marking the particular data block as current;

after marking the particular data block as current, applying a second redo record to the particular data block without performing the detailed comparison.

26. The one or more non-transitory computer-readable media of claim 13, wherein the fetched one or more second data blocks are most-recent versions of the one or more second data blocks in the primary database.

* * * * *